United States Patent [19]

Jacobsen et al.

[11] Patent Number: 5,267,672
[45] Date of Patent: Dec. 7, 1993

[54] ICE DISPENSER AND DISPLAY

[75] Inventors: Sam J. Jacobsen, Middleton; Jody W. Bigalke, New Lisbon, both of Wis.

[73] Assignee: Leer Manufacturing Limited Partnership, New Lisbon, Wis.

[21] Appl. No.: 925,057

[22] Filed: Aug. 4, 1992

[51] Int. Cl.⁵ ............................................. B67D 5/38
[52] U.S. Cl. ..................................... 222/159; 222/131;
    222/144.5; 222/146.6; 222/227; 62/344;
    198/716; 198/733; 198/860.3
[58] Field of Search ................... 222/129.1, 131, 144.5,
    222/146.6, 159, 227, 228, 241, 331, 415, 561;
    62/344; 198/716, 733, 735.3, 860.3, 860.4, 860.5

[56] References Cited

U.S. PATENT DOCUMENTS

| | | | |
|---|---|---|---|
| 2,249,588 | 7/1941 | Waddle | 198/860.3 X |
| 2,652,808 | 9/1953 | Wagner | 198/735.3 X |
| 4,093,066 | 6/1978 | Mitchell et al. | 198/860.4 X |
| 4,871,060 | 10/1989 | Dahl et al. | 198/716 |
| 5,104,007 | 4/1992 | Utter | 222/146.6 |
| 5,112,477 | 5/1992 | Hamlin | 222/146.6 X |
| 5,165,255 | 11/1992 | Alvarez et al. | 222/146.6 X |

*Primary Examiner*—Gregory L. Huson
*Attorney, Agent, or Firm*—Lathrop & Clark

[57] ABSTRACT

A rotatable auger is disposed within an ice chest to direct ice through an opening into a tubular conduit through which runs a flexible looped cable. Plastic paddles are fixed to the cable at spaced intervals and engage with ice received within the conduit and advance the ice through the conduit to an above-the-counter transparent display segment of the conduit having an outer transparent plastic tube surrounding an inner transparent plastic tube through which the conveyed ice is visible. The ice is conveyed to a discharge opening where a user activated gate valve controls ice discharge. An ice return tube directs undispensed ice back to the ice chest.

22 Claims, 4 Drawing Sheets

ICE DISPENSER AND DISPLAY

FIELD OF THE INVENTION

The present invention relates to ice dispensing apparatus in general and to ice dispensing apparatus accessible to retail consumers in particular.

BACKGROUND OF THE INVENTION

Soft drinks such as colas, fruit juices and mineral waters, are popularly served chilled. The most effective way to maintain a dispensed beverage at a reduced temperature throughout the period of time required to consume the drink, is to mix water ice with the beverage. Combination beverage and ice dispensers are well known to the art. Typically, these devices combine an ice chest either above or below the counter which dispenses crushed or cube ice from a cup actuated spigot into the consumer's empty cup. Lever actuated beverage dispensers are located alongside the ice dispenser and are typically supplied by fountain beverages stored in refrigerated conditions at a remote location and piped to the dispenser through flexible tubing. In the past, such self-service beverage dispensers have been located in cafeteria line type restaurants or in employee dining areas. More recently, convenience stores, often in connection with retail gasoline sales outlets, have offered a wide range of ready-to-eat snacks or meals. In such a location, fountain beverages are made available for self-service dispensing by the customer. Typically, a customer will select the serving size beverage container desired, fill the container with the desired beverage and proportion of ice and pay for the beverage along with other purchases at a checkout counter. By making beverages available on a self-service basis, labor costs are reduced, and customers are free to select their desired beverage with or without ice at their leisure. Because customers may enter a convenience store for numerous reasons other than dining purposes, a convenience store beverage dispenser must serve as an advertisement or display for the products dispensed in order to appeal to impulse purchasers. It has generally been observed that a consumer is more likely to purchase an item which is visible to him prior to the purchase. In this way a consumer may judge the quality and appeal of the item before making the decision to buy. Conventional beverage and ice dispensers however, due to the need to refrigerate and store at reduced temperatures the contents commonly have blank metal exteriors or printed or luminated signs or facia. These printed and ornamental displays may induce favorable consumer response by suggesting coolness and satisfaction of thirst, but mere images are generally less effective than the actual product.

What is needed is an ice dispenser for self-service use which provides for consumer display of the ice to be dispensed.

SUMMARY OF THE INVENTION

The combination ice dispenser and display of the present invention provides an attractive and fully visible display of ice prior to its dispensing from the machine. The ice dispenser has an insulated ice chest mounted to a dispenser housing. A conduit extends from the ice chest to an ice discharge opening. The conduit communicates with the ice chest to receive ice therefrom. Portions of the conduit are transparent and define a transparent conduit segment which is visible to an ice dispenser user. A flexible looped cable extends through the conduit. A plurality of paddles are connected to the cable at spaced intervals. The paddles are advanced through the conduit as the cable is pulled. The paddles engage against and convey ice from the ice chest through the transparent conduit segment to the ice discharge opening, making ice to be dispensed visible through the transparent conduit segment to the ice consumer. The transparent conduit segment has an inner transparent tube and an outer transparent tube surrounding the inner tube which defines an insulative gap between the two tubes. The gap is filled with inert gas. An ice return tube extends from a position in the conduit downstream of the discharge opening. The return tube extends from the conduit to the ice chest to allow recirculation of the undispensed ice. A rotatable auger is mounted within the chest to advance ice from the chest into the conduit.

It is an object of the present invention to provide an ice dispenser which displays the ice to be dispensed to a consumer.

It is another object of the present invention to provide an ice dispenser having an ice chest positioned beneath the counter with an ice flow path which is curvilinear.

It is a further object of the present invention to provide an ice dispenser which may rapidly advance ice from a storage chest to a dispensing outlet.

Further objects, features and advantages of the invention will be apparent from the following detailed description when taken in conjunction with the accompanying drawings showing the preferred embodiment of the invention.

DESCRIPTION OF THE PREFERRED EMBODIMENT

Figure 1:
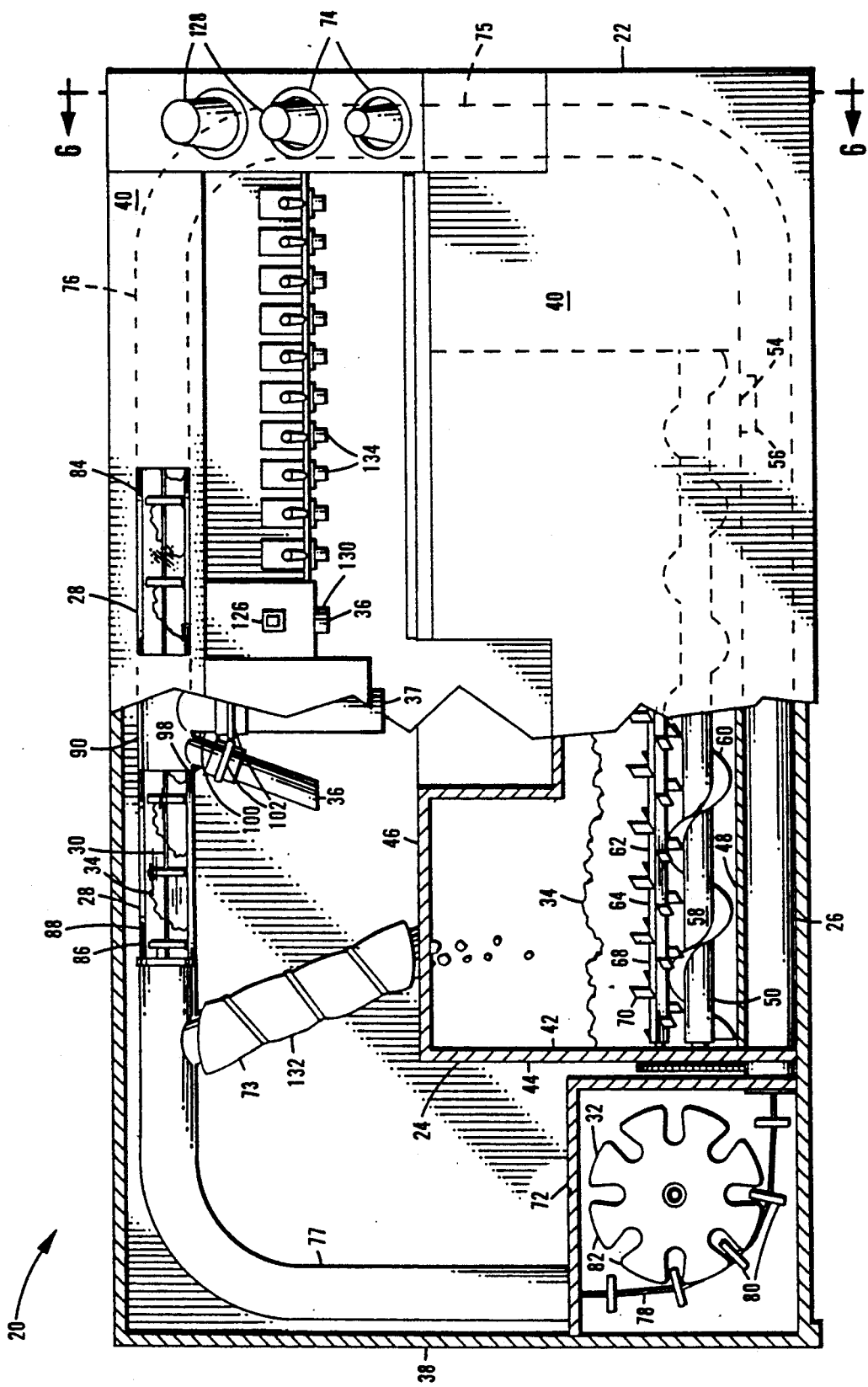
FIG. 1 is a front elevational view, partly broken away, of the ice dispenser of the present invention.

Referring more particularly to FIGS. 1-6, wherein like numbers refer to similar parts, an ice dispenser with visible ice display 20 is shown in FIG. 1.

The dispenser 20 has a free standing housing 22 to which are mounted an ice chest 24 and a tubular conduit 26. The conduit 26 has a transparent display segment 28. A flexible cable paddle assembly 30 runs through the conduit 26 and is driven by a sprocket wheel 32 to advance ice 34 from the ice chest 24 to three ice outlets 36, 37.

The housing 22 is freestanding and self-supporting and has a square tubular steel frame 38 to which decorative exterior panels 40 are mounted. The exterior panels 40 are preferably removable or hinged to the housing 22 to permit easy access to the ice dispenser interior.

The ice chest 24 is connected to the housing frame 38 and is preferably formed of a stainless steel tank 42 with insulative foam panel walls 44. The chest 24 has a lift out cover 46, shown in FIG. 6, which may be displaced to permit the loading of the chest 24 with additional ice 34. The ice chest tank 42 has a rearwardly sloping bottom 48 which directs the ice to a rotatable auger 50 located within a trough 52 at the lowest point of the tank 42. An ice chest ice exit or outlet 54 is located at the far end of the trough 52 in the direction of cable paddle assembly 30 travel. The ice chest outlet 54 discharges to a conduit inlet opening 56. The auger 50 is preferably stainless steel with a central shaft 58 with a plurality of substantially helical flights 60. The auger shaft 58 is connected to a drive motor 63 such that when the shaft is rotated, ice from within the chest 24 is advanced toward the chest outlet 54.

An agitator shaft 62 is mounted within the tank 42 to rotate about an axis parallel to the auger 50 at a position forward of and above the auger 50. The agitator shaft 62 is preferably formed of stainless steel and has a square tubular shaft 64 from which extend pins 66 which are perpendicular to the faces 68 of the shaft 64. Agitator plates 70 extend from each pin 66 perpendicular to the adjacent shaft face 68 and are angled at approximately 45 degrees from a plane which intersects the pins and the shaft axis.

The agitator shaft 62 is preferably rotated together with the auger 50 to break up agglomerations of ice within the chest 24 prior to its entry into the trough 52 and its engagement with the auger 50.

Figure 6:
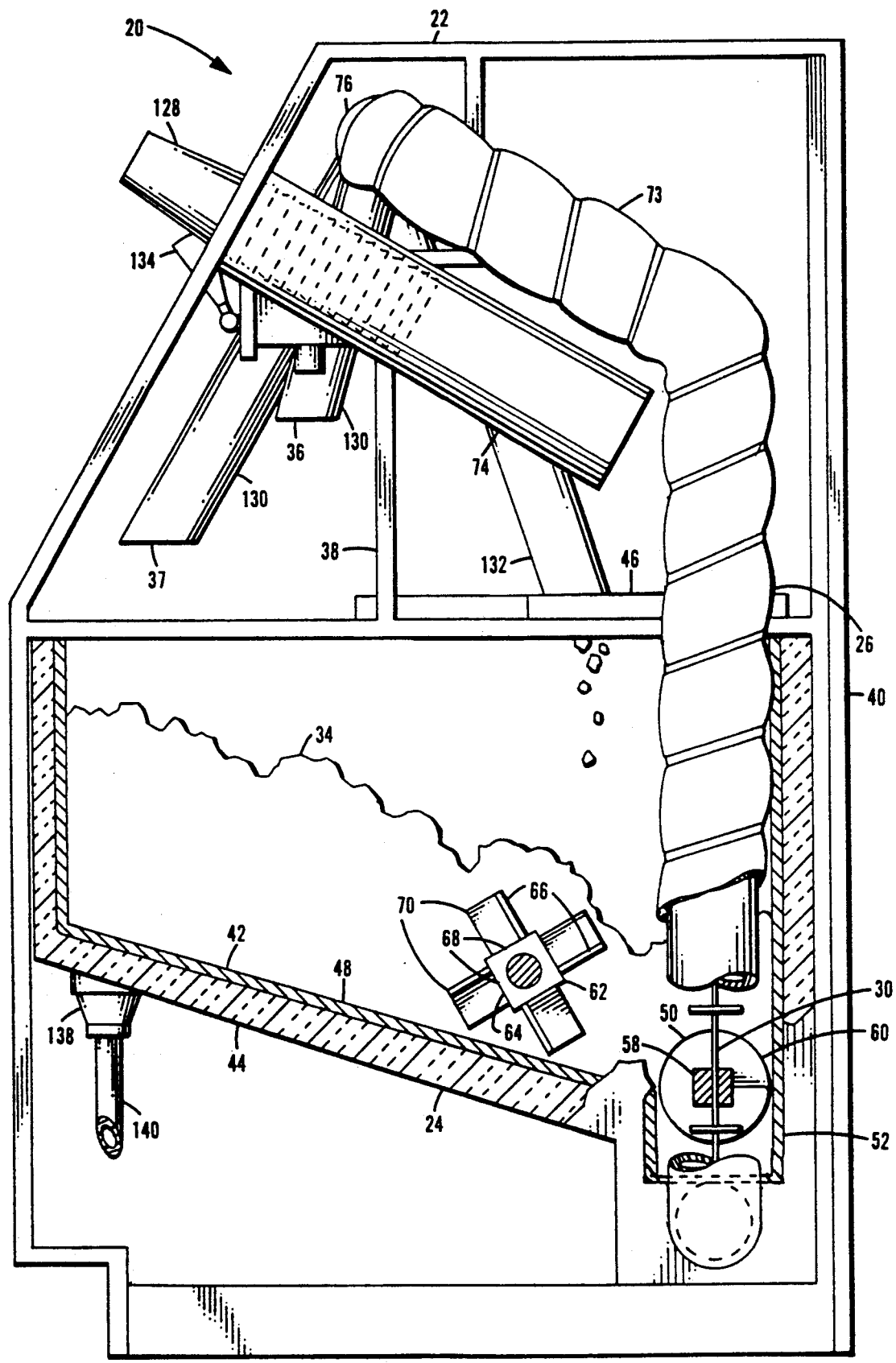
FIG. 6 is a cross-sectional view of the ice dispenser of FIG. 1 taken along section line 6—6.

As best shown in FIG. 1, the conduit 26 extends from a sprocket housing box 72, then beneath the ice chest 24, and up the side of the housing 22 along the rear of the housing through a vertical segment 75. To clear the cup supply cylinder 74, the vertical segment 75 of the conduit 26 may be angled forward, as shown in FIG. 6. The vertical segment 75 is connected with a horizontal conduit segment 76 at the upper front of the housing 22. The horizontal conduit segment 76 has transparent display segments 28 on either side of the ice outlets 36 and then extends downwardly to the sprocket box 72. The conduit is preferably formed of cylindrical PVC tubing and is insulated along those portions which convey ice with a foam insulative material 73 such as Armoflex foam. Ice is transported through the conduit 26 by a cable paddle assembly 30 such as the CABLEVEY ® feed transport system manufactured by Intraco, Inc. of Oskaloosa, Iowa. The cable paddle assembly 30 is preferably comprised of a looped 7×19 strand stainless steel nylon coated cable 78 to which nylon disk paddles 80 are fixed at spaced intervals. When the sprocket wheel 32 is rotated, the entire looped cable paddle assembly 30 is driven through the conduit 26. Ice which enters the conduit inlet opening 56 is engaged by an upstream paddle 80 and is advanced through the conduit 26. The paddle supports the ice 34 from underneath as it is elevated through the vertical conduit segment 75 while the conduit walls provide lateral support for the conveyed ice. Because of the flexibility of the cable 78, the ice may be conveyed vertically, horizontally, or at some intermediate angle to follow a path having multiple changes of direction.

Figure 5:
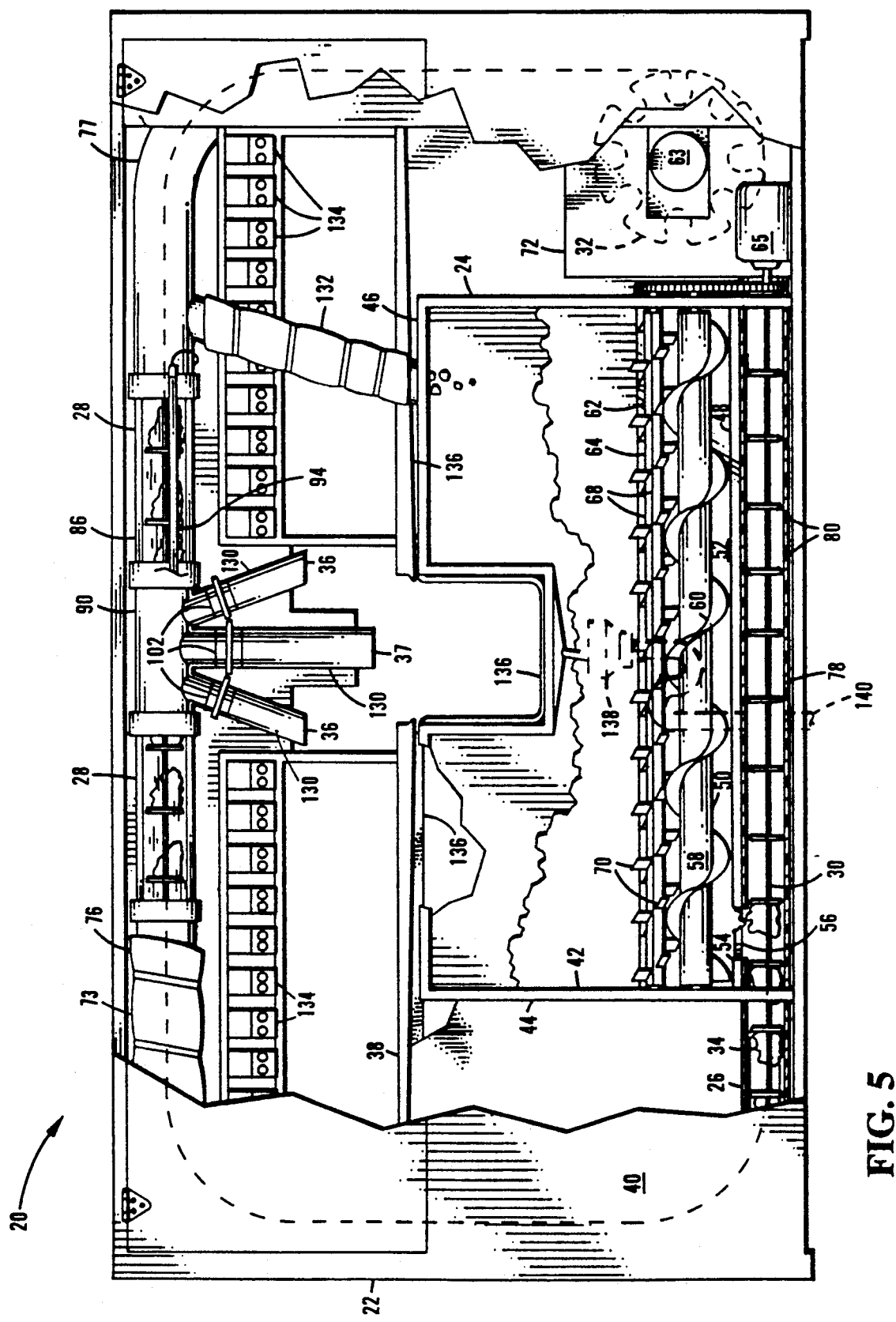
FIG. 5 is a rear elevational view, partly broken away, of the ice dispenser of FIG. 1.

The sprocket wheel 32 is preferably formed of Tivar 100 food grade ultra-high-molecular weight polyethylene, and is rotated by the drive motor 63, shown in FIG. 5. Although separate motors may be provided for the sprocket wheel 32, the auger 50, and the agitator shaft 62, or the three rotating elements of the dispenser 20 may be driven in unison by a single drive motor, the auger 50 and agitator shaft 62 are preferably driven by a 5.4 rpm drive motor 65, with the sprocket wheel 32 being driven by a 2 rpm drive motor 63. The sprocket wheel 32 has a plurality of protruding teeth 82 which engage against the paddles 80 to advance the cables 78. The teeth 82 preferably are formed with a groove on the exterior perimeter to align the cable 78 with the teeth 82.

Two display windows 84 are formed in the housing exterior panels 40 above the ice outlets 36. The windows 84 are preferably glazed with transparent glass or plastic and allow an ice consumer to view the display segments 28 of the conduit 26 within the ice dispenser housing 22.

Figure 2:
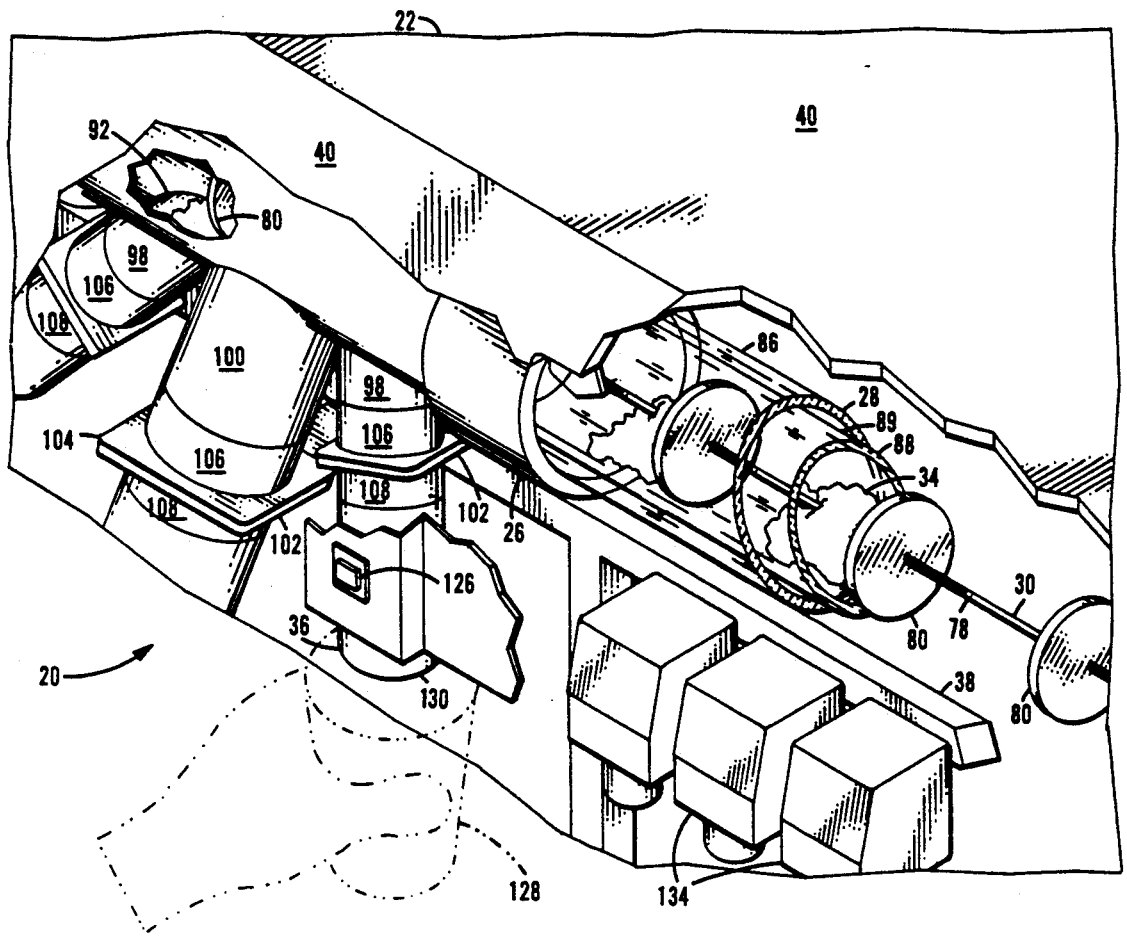
FIG. 2 is a fragmentary isometric view, partly broken away, of the display tube of the ice dispenser of FIG. 1.

As shown in FIG. 2, each display segment 28 has two cylindrical substantially transparent plastic tubes 86, 88. An outer tube 86 surrounds a smaller diameter inner tube 88. An insulative gap 89 is defined between the coaxial outer and inner tubes 86, 88. The gap is filled with a gas, preferably nitrogen gas. The display segments 28 are connected at one end to the horizontal conduit segment 76 and in the center are connected to a discharge segment of tubing 90 which has one or more discharge openings 92. In the preferred embodiment, three discharge openings 92 are provided, two of which communicate with beverage ice outlets 36, and one of which communicates with a bag ice outlet 37. The discharge segment 90 will preferably be hidden from view and thus fabricated of conventional opaque tubing. A Neon Light 94 is mounted to the housing 22 to direct light onto the ice 34 contained within each display segment 28. The light 94 serves to illuminate the displayed ice 34. An insulative gap 89 limits conductive and convective heating of the display tube interior.

Figure 3:
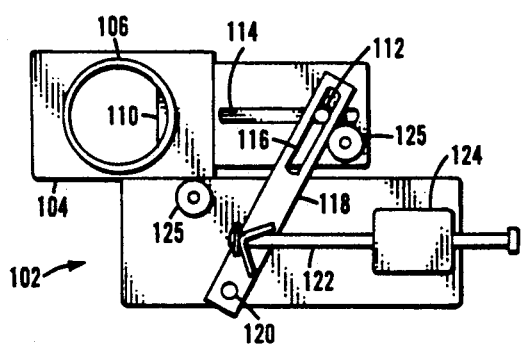
FIG. 3 is a top plan view of the ice dispensing mechanism of the ice dispenser of FIG. 1 in an open position.
Figure 4:
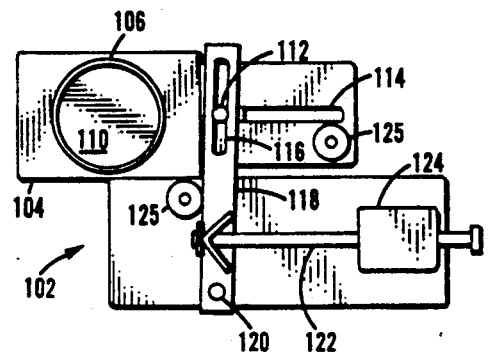
FIG. 4 is a top plan view of the mechanism of FIG. 3 shown in a closed position.

The discharge segment 90 has three discharge tubes 98, 100, one extending from each discharge opening 92. A solenoid operated gate valve 102 is connected to each discharge tube 98, 100. As shown in FIGS. 3 and 4, each gate valve 102 has a valve housing 104 with an upper tube 106 which is connected to a discharge tube and a lower tube 108 which is spaced from the upper tube 106 to permit the interposition of a gate plate 110 between the two tube portions 106, 108 of the valve housing 104. A pin 112 extends from the gate plate 110 through a slot 114 in the valve housing 104. The pin 112 is captured within a slot 116 in a link 118. The link 118 is pivotable about a nylon bushing 120. A piston 122 is actuated by a solenoid 124 to drive the link 118 and associated gate plate 110 from an open position, shown in FIG. 3, in which ice is dispensed through the gate valve 102, to a closed position, shown in FIG. 4, in which the gate plate 110 blocks the gate valve 102 and prevents the escape of ice. Rubber bumpers 125 cushion the impact of the link 118 at the extreme ends of its travel and reduce the noise of operation.

The gate valves 102 are operated by an ice consumer to dispense a desired quantity of ice by depressing a dispensing button 126 located on an exterior panel 40, as shown in FIG. 2. The button 126 is wired to the gate valve 102 such that the gate valve remains open so long as the button 126 is depressed. By depressing the button 126 the motors 63, 65 are also activated to advance the cable paddle assembly and bring a continuous supply of ice to be dispensed. Although ice may be discharged directly through the housing lower tube 108 into a beverage container 128, in a preferred embodiment a dispensing tube 130 extends downwardly from the valve housing lower tube 108 and is angled such that to the consumer the source of ice is directly below the display segment 28. By positioning the dispensing tube 130 in such a manner, the consumer has a greater impression of receiving the ice which is currently on display within the display tube. The dispensing tube 130 may be PVC tubing or tygon flexible tubing.

As the discharge tubes 98, 100 will tend to accumulate undispensed ice therein, it is desirable that the discharge tubes 98, 100 be no longer than needed. It is also desirable that the dispensing tubes 130 be of as short of length as possible. The total distance of tubing between the gate plate 110 and the exit of ice from the dispensing tube 130 is important as a consumer will typically remove his finger from the dispensing button 126 once the beverage container 128 is judged to have received the desired amount of ice. Once the gate plate 110 has been closed, however, the dispensing tube 130 will still have a certain amount of ice in transit which will discharge into the beverage container 128.

During periods of heavy use, ice 34 will remain within the conduit 26 for only a short time. However, during periods of only occasional dispensing activity, if ice 34 were allowed to remain within the conduit, separated from the heavily insulated ice chest 24, it would eventually melt. For this reason, the drive motors 63, 65 are connected to an electronic controller with timer (not shown) which activates the sprocket wheel 32 at preset intervals for a preset period of time to advance the ice 34 through the conduit 26 to limit melting. Ice is returned to the ice chest 24 from the conduit 26 through an ice return tube 132. The ice return tube 132 is connected to the conduit horizontal segment 76 after the discharge segment 90 and display segments 28. An opening (not shown) is formed in the bottom of the conduit 26 above the ice return tube 132 such that all ice being conveyed by the cable paddle assembly 30 which passes the display segments 28 is shunted through the return tube 132 into the ice chest 24. The return tube 132 is removably connected to the ice chest cover 46 so that the return tube may be disconnected to permit opening of the cover 46. The conduit 26 has a cable return segment 77 which directs the cable paddle assembly 30 downwardly to the sprocket wheel 32.

As shown in FIG. 1, the dispenser 20 is provided with a plurality of beverage dispensers 134 which are supplied with cooled beverages stored at a remote location. To prevent spillage of beverages or melted ice, pans 136, shown in FIG. 5, are mounted to the housing beneath the beverage dispensers 134 and the ice dispensing tubes 130. These pans 136 empty into a collector 138 which is connected to a disposal line 140 which in turn extends from the ice dispenser 20 to a waste water disposal system.

Because the cable paddle assembly 30 has paddles 80 which are large with respect to the particles of ice conveyed by the dispenser 20, a variety of ice products may equally well be dispensed by the dispenser 20. For example, cube ice, scotsman's ice, turbo ice, or crushed ice may all be advantageously dispensed. Although the dispenser 20 has been illustrated as having an ice chest 24 for restocking with ice produced at a remote location, it should be noted that the dispenser 20 may be provided with an integral ice maker for restocking of the ice chest 24. It will be noted that the cable paddle assembly 30 allows the ice chest 24 to be placed beneath the dispensers and hence provides for convenient restocking.

It should also be noted that transparent display segments may be provided through other portions of the conduit travel. Furthermore, larger dispenser installations may accommodate multiple dispensing segments or plural conduits.

It is understood that the invention is not confined to the particular construction and arrangement of parts herein illustrated and described, but embraces all such modified forms thereof as come within the scope of the following claims.

We claim:
1. An ice dispenser comprising:
a) a housing;
b) an insulated ice chest contained within the housing and having portions defining an exit for ice from the chest;
c) a conduit having portions defining an inlet opening adjacent the ice chest exit and adapted to receive ice from the chest therethrough;
d) a continuous looped flexible cable extending through the conduit, the cable having a plurality of paddles fixed to the cable;
e) a drive engaged with the cable paddle assembly to cause the paddles to move through the conduit, such that ice which is received within the conduit is engaged by the paddles and transported through the conduit;
f) portions of the conduit defining at least one ice discharge opening at a location outside of the chest;
g) a moveable gate positioned to selectably block the ice discharge opening or to withdraw from the ice discharge opening to permit the dispensing of ice therethrough; and
h) an actuator connected to the gate to be operated by a user to dispense ice when desired.

2. The ice dispenser of claim 1, further comprising:
a) a transparent conduit segment connected in line with the conduit, such that the paddles and engaged ice move through the transparent segment prior to being dispensed, such that the ice to be dispensed is visible to a user.

3. The ice dispenser of claim 2 wherein the transparent conduit segment comprises an inner transparent tube and an outer transparent tube surrounding the inner tube, wherein an insulative gap is defined between the inner and outer transparent tubes and a gas is disposed within the gap.

4. The ice-dispenser of claim 1 further comprising:
a) portions of the conduit defining a return opening spaced after the discharge opening in the direction of paddle travel; and
b) an ice return tube extending from the return opening to the ice chest, such that ice engaged by the paddles is received through the return opening and conveyed to the ice chest by the ice return tube as the cable paddle assembly is advanced through the conduit.

5. The ice dispenser of claim 1 further comprising a rotatable auger mounted within the chest and adapted to advance ice contained within the chest to the chest ice exit.

6. The ice dispenser of claim 5 further comprising a rotatable shaft mounted to rotate above the auger, the shaft having a plurality of radially extending protrusions adapted to break up agglomerations of ice contained within the chest.

7. The ice dispenser of claim 1 further comprising a beverage dispenser mounted to the housing in proximity to the ice discharge opening.

8. An ice dispenser comprising:
a) a housing;
b) an ice chest mounted to the housing and adapted to contain ice therein;
c) a conduit extending from the ice chest to at least one ice discharge opening, the conduit communicating with the ice chest to receive ice from the chest, wherein the conduit has at least one substantially transparent conduit segment having transparent portions which are visible to an ice dispenser user;
d) a flexible cable which extends through the conduit;
e) a plurality of paddles connected to the cable at spaced intervals, such that the paddles are advanced through the conduit as the cable is pulled, wherein the paddles are adapted to engage against and convey ice from the ice chest through the transparent conduit segment to the ice discharge opening, such that the ice to be dispensed is visible through the transparent conduit segment to the ice dispenser user.

9. The ice dispenser of claim 8 further comprising a light mounted within the housing to illuminate the ice contained within the transparent conduit segment.

10. The ice dispenser of claim 8 wherein the transparent conduit segment comprises an inner transparent tube and an outer transparent tube surrounding the inner tube, and wherein an insulative gap is defined between the inner and outer transparent tubes and a gas is disposed between the tubes.

11. The ice dispenser of claim 8 further comprising:
a) portions of the conduit defining a return opening spaced after the discharge opening in the direction of paddle travel; and
an ice return tube extending from the return opening to the ice chest, such that ice engaged by the paddles is received through the return opening and conveyed to the ice chest by the ice return tube as the cable paddle assembly is advanced through the conduit.

12. The ice dispenser of claim 8 further comprising a rotatable auger mounted within the chest and adapted to advance ice contained within the chest to the conduit.

13. The ice dispenser of claim 12 further comprising a rotatable shaft mounted to rotate above the auger, the shaft having a plurality of radially extending protrusions adapted to break up agglomerations of ice contained within the chest.

14. The ice dispenser of claim 8 further comprising a beverage dispenser mounted to the housing in proximity to the ice discharge opening.

15. The ice dispenser of claim 8 wherein the ice discharge opening is located in the conduit between two transparent conduit segments.

16. The ice dispenser of claim 8 further comprising a gate valve disposed in the ice discharge opening, the gate valve being operable to alternatively block or permit the escape of ice through the discharge opening.

17. The ice dispenser of claim 8 further comprising a rotatable sprocket engaged with the paddles and a drive motor connected to rotate the sprocket to advance the paddles through the conduit.

18. The ice dispenser of claim 17 further comprising a controller electronically connected to the drive motor to advance the paddles for a preset period of time at preset intervals.

19. An ice dispenser comprising:
housing;
b) an ice chest mounted to the housing and adapted to contain ice therein;
c) a conduit extending from the ice chest to at least one ice discharge opening, the conduit communicating with the ice chest to receive ice from the chest; and
d) at least one transparent conduit segment connected to the conduit, wherein portions of the conduit are substantially transparent, and the transparent conduit segment is visible to an ice dispenser user, and wherein the transparent conduit segment has an inner transparent tube and an outer transparent tube surrounding the inner tube, and wherein an insulative gap is defined between the inner and outer transparent tubes such that ice may be conveyed through the inner tube from the housing to the discharge opening.

20. The ice dispenser of claim 19 further comprising a light mounted within the housing to illuminate the ice contained within the transparent conduit segment.

21. The ice dispenser of claim 19 wherein the ice discharge opening is located in the conduit between two transparent conduit segments.

22. The ice dispenser of claim 19 further comprising a gate valve disposed in the ice discharge opening, the gate valve being operable to alternatively block or permit the escape of ice through the discharge opening.

* * * * *